Oct. 29, 1940.    V. W. KLIESRATH    2,219,323
GEAR SHIFTING MECHANISM
Filed May 21, 1934    5 Sheets-Sheet 1

INVENTOR.
VICTOR W. KLIESRATH
BY H.O.Clayton
ATTORNEY

INVENTOR.
VICTOR W. KLIESRATH
BY
ATTORNEY

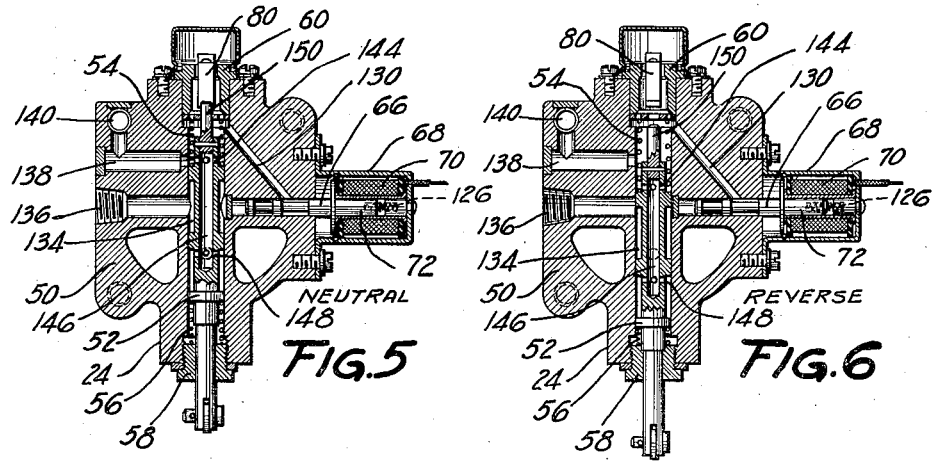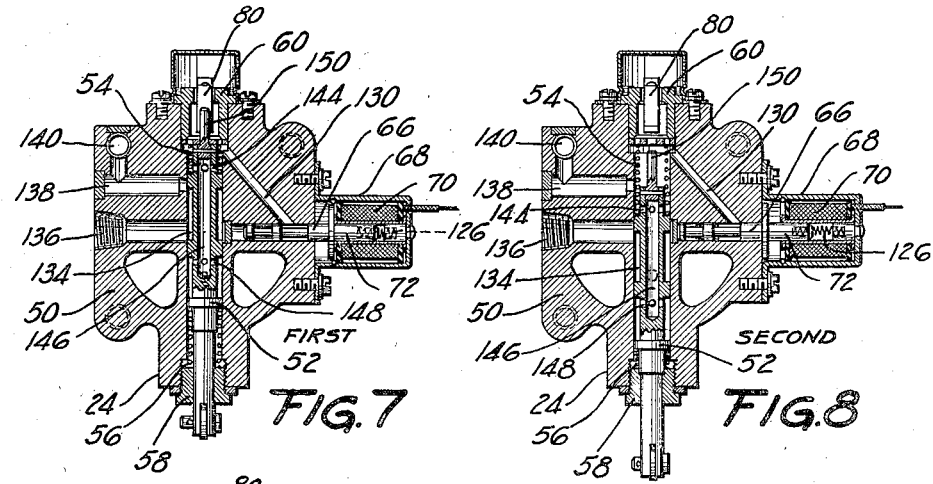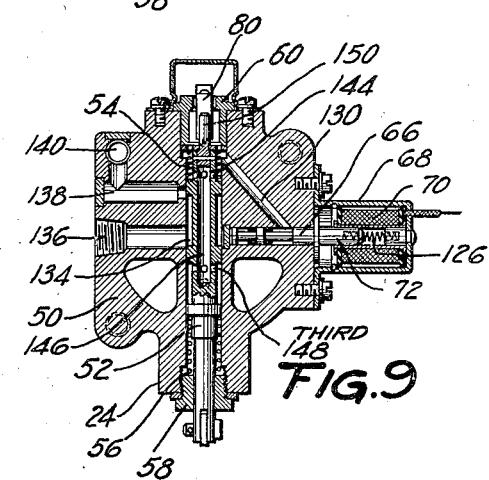

INVENTOR.
VICTOR W. KLIESRATH
BY H. O. Clayton
ATTORNEY

Oct. 29, 1940.  V. W. KLIESRATH  2,219,323
GEAR SHIFTING MECHANISM
Filed May 21, 1934  5 Sheets-Sheet 5
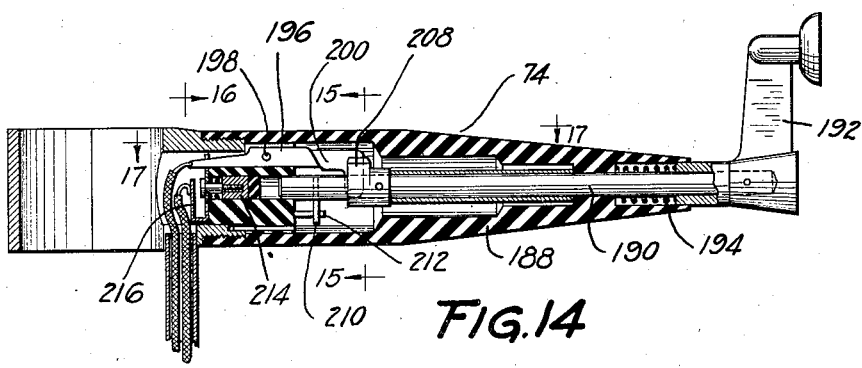
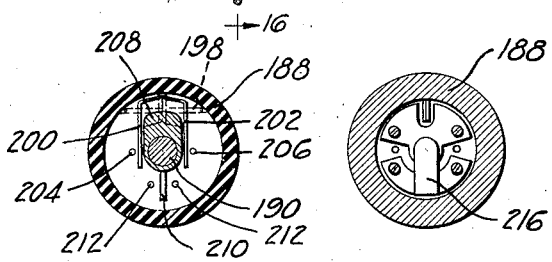
FIG.15  FIG.16  FIG.17
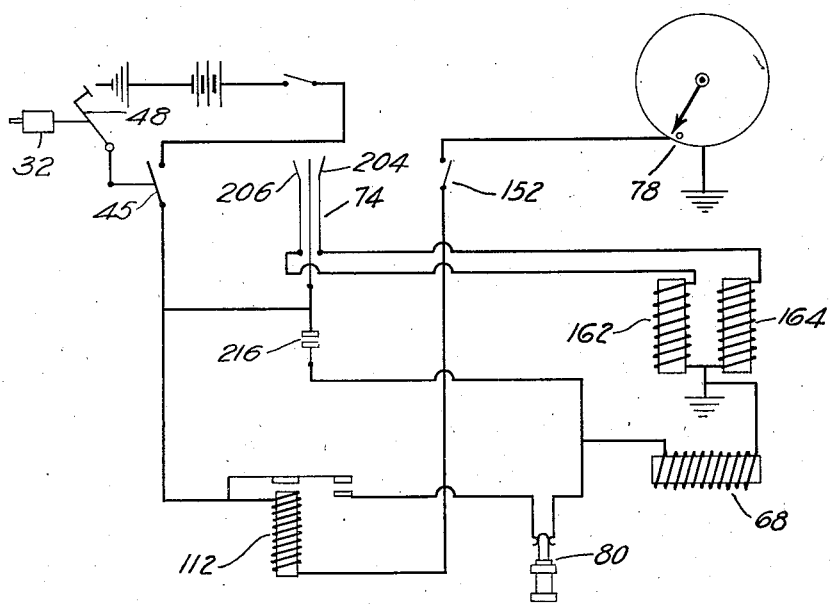
FIG.18
INVENTOR.
VICTOR W. KLIESRATH
BY H. O. Clayton
ATTORNEY Patented Oct. 29, 1940

2,219,323

UNITED STATES PATENT OFFICE 2,219,323

GEAR SHIFTING MECHANISM

Victor W. Kliesrath, South Bend, Ind., assignor to Bendix Aviation Corporation, South Bend, Ind., a corporation of Delaware Application May 21, 1934, Serial No. 726,627

2 Claims. (Cl. 192—3.5)

This invention relates in general to means for controlling the operation of an automotive vehicle and more particularly to means correlating the control of the internal-combustion engine, the clutch and the change-speed transmission to simplify the technic of operation of these units, minimize the physical effort necessary to their operation and in general provide a simple and effective mechanism for the purposes intended.

The trend in the present day automotive vehicle is to power operation of the controls of the power plant; also, to reducing the number and complexity of the controls. It is accordingly the principal object of the invention to provide simply controlled pressure differential operated power means for operating the standard types of clutch and transmission with which the vehicle is equipped, said means to be in part controlled by the means for operating the throttle of the engine. With the present invention the control of the clutch is in part effected by means of the accelerator and the control of the transmission is in the main limited to a simple form of manually operated selector.

A further object of the invention is to provide power means for operating the clutch and transmission, which, in a large measure, will be automatic in action and will, with a minimum of operations on the part of the driver, accurately simulate the conventional manual operation of these mechanisms. To this end means are provided for automatically disengaging the clutch by power with a release of the accelerator pedal and therefore after the power of the internal-combustion engine has been reduced to a minimum, said means being so constructed that after the release of the accelerator the transmission may then, but not until then, be operated.

The invention also contemplates the provision of interlocking clutch and transmission operating power means, preferably of the manifold vacuum operated type, controlled in part by the accelerator of the vehicle and in part by a manually operable selector mechanism, a valve mechanism being preferably incorporated in the power means to insure a disengagement of the clutch prior to a transmission operation of the power means.

A further feature of the invention is to provide means, controlled in part by the accelerator pedal, for insuring a power loading of the gear shift lever, at least until the clutch is engaged sufficiently to facilitate the completion of the gear changing operation. To this end the invention contemplates the provision of a switch means, operable by the clutch, for cutting out the operation of the transmission operating power means after the clutch has been engaged to a predetermined amount and/or a check valve means, incorporated in the fluid transmitting connection leading to the transmission operating power means and so cooperating with the remaining mechanism as to insure a continuous power operation of the transmission, at least until the clutch has been engaged sufficiently to enable the engine, acting through the intermediary of the clutch, to aid the power means in completing the gear shifting operation.

With respect to the power operation of the transmission of an automotive vehicle the prior art it replete with suggestions of so-called built-in mechanisms for operating the gear train of the transmission. Such mechanisms are, however, necessarily complicated and expensive, usually requiring a modification of the standard form of transmission and including numerous conduits, valves, cylinders, etc. The invention is accordingly specifically directed to power means for operating the transmission, the object being to provide a simple form of accessory unit adapted to operate the present day type of transmission including a conventional gear shift lever, the power element of the unit being preferably connected directly to the shift lever to operate the same in a manner fully simulating a conventional manual operation thereof. To this end there is suggested a universally mounted pressure differential operated actuator unit, operably connected to the shift lever at a point above the floorboard, said actuator being selectively operable to move the shift lever to any one of its conventional positions.

A further object of the invention is to provide valve mechanism for controlling the aforementioned gear shift operating actuator unit, said mechanism being completely electrically operated to effect all of the operations of the actuator in its simulation of a conventional manual operation of a gear shift lever.

Yet another object is to provide an electrically operated valve mechanism for said actuator, said mechanism being controlled either completely by a hand operated switch or jointly by a foot operated treadle and said switch.

A further object of the invention is to provide an actuator controlling valve mechanism which may be either manually or electropneumatically operated at the will of the driver, the manually operated means being so interlocked with the electrical means as to be dependent thereon for a complete control of the valve unit.

The invention also contemplates the provision of a hand operated electrical switch, preferably mounted on the steering column, and which is operative as a selector to control the power operation of a gear shift lever to simulate a conventional manual operation thereof. A further feature of the invention is to provide such a switch mechanism, manually operable in such fashion as to simulate a conventional manual operation of a gear shift lever.

Other objects of the invention, including a compact and effective two-way treadle switch, a simple and efficient relay, and other desirable details of construction and combinations of parts will be apparent from the following description and claims when considered together with the accompanying drawings, in which:

Figure 5 is a vertical sectional view taken on the line 5—5 of Figure 1 disclosing the elements of the valve mechanism in operative position to maintain the shift lever in its neutral position in the low and reverse channel of the transmission;

Figure 6 is a view, similar to Figure 5, disclosing the valve mechanism operative to place the shift lever in reverse gear position;

Figure 7 is a sectional view, similar to Figure 5, disclosing the valve mechanism operative to place the shift lever in first gear position;

Figure 8 is a sectional view, similar to Figure 5, disclosing the valve mechanism operative to place the shift lever in second gear position;

Figure 9 is a sectional view, similar to Figure 5, disclosing the valve mechanism operative to place the shift lever in high gear position;

Figure 14 is a longitudinal sectional view disclosing the details of the hand operated selector switch for controlling the valve mechanism by power;

Figure 1:
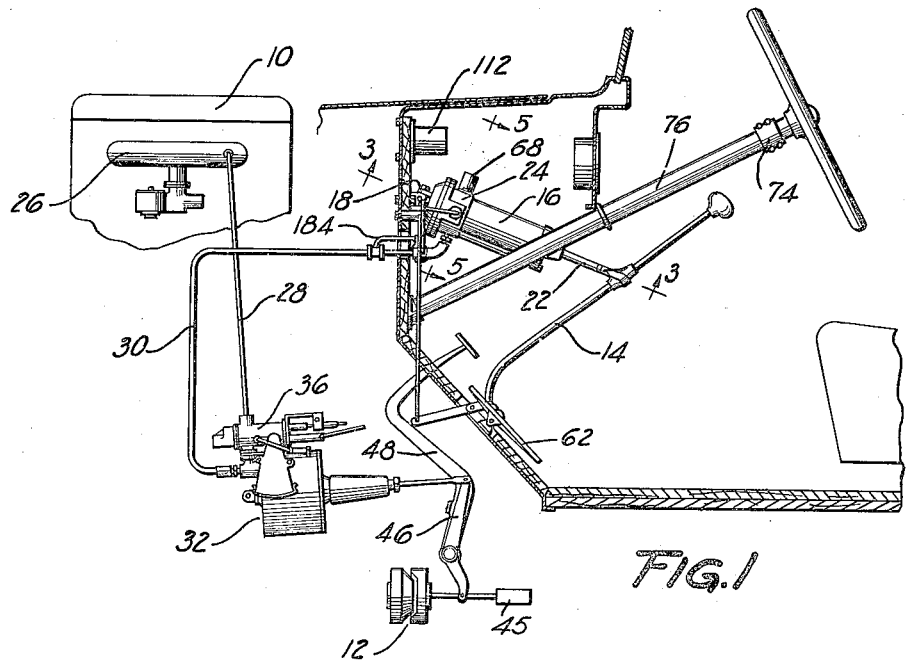
Figure 1 is a sectional view taken through the driver's compartment disclosing, in side elevation, the power gear shift mechanism constituting the invention.
Figure 2:
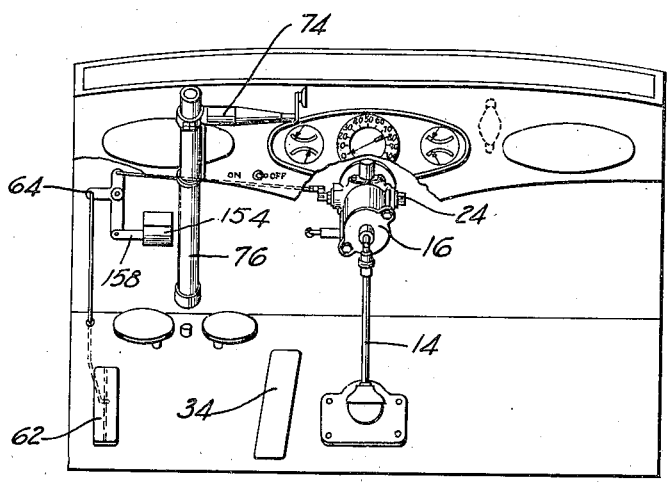
Figure 2 is a plan view of the driver's compartment disclosing certain of the elements of the gear shift mechanism constituting the invention.

Figures 15 and 16 are sectional views taken respectively on lines 15—15 and 16—16 of Figure 14 disclosing further details of the selector switch;

Figure 17 is a view taken on the line 17—17 of Figure 14 disclosing further details of the selector switch; and Figure 18 is a diagrammatic view disclosing the electric hook-up for controlling the actuator of Figures 1 and 2.

In that embodiment of the invention disclosed diagrammatically in Figures 1 and 2 there is shown an internal-combustion engine 10, which is drivably connected to the usual propeller shaft, not shown, through the intermediary of a conventional friction clutch 12 and a conventional variable-speed transmission, the latter being controllable by the usual shift lever 14. The invention in its broadest aspect is directed to power means for operating the clutch and transmission, and more particularly to a power means for so operating the transmission as to simulate a conventional manual operation thereof.

To the above end there is provided a double-acting actuator unit 16, universally mounted to the dash at 18, a piston or power element 20 thereof being operably connected to the shift lever by a rod 22. A control valve unit 24, mounted in one end of the actuator unit, serves to intermittently energize and deenergize the same to operate the shift lever by alternately connecting certain compartments of the unit with a source of vacuum power and with the atmosphere. The intake manifold 26 is utilized as the source of vacuum and is connected with the actuator unit by conduits 28 and 30, a vacuum operated actuator or motor unit 32 being incorporated in the fluid circuit to operate the clutch. The clutch operating actuator is not claimed herein, inasmuch as the same, both in its relation as a unit to the instant invention and in the particular details of its construction, is more fully disclosed, described and claimed in an application of Victor W. Kliesrath, No. 721,683, filed April 21, 1934, in an application of Victor W. Kliesrath, No. 592,170, filed February 10, 1932, and an application of Victor W. Kliesrath, et al., No. 580,434, filed December 11, 1931.

Figure 12:
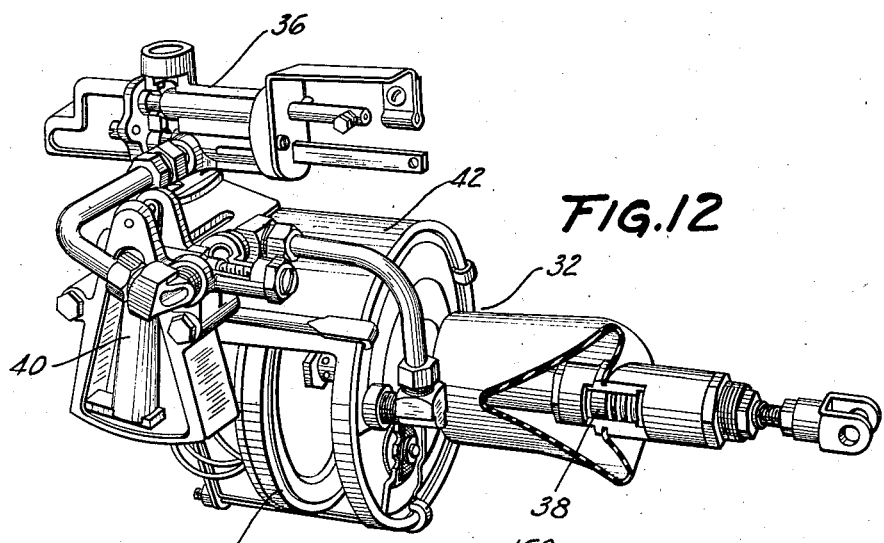
Figure 12 is a perspective view, partly in section, disclosing the clutch operating power unit.

Briefly describing the operation of the clutch actuator 32, upon release of an accelerator 34, a combined cut-out, three-way and bleed valve unit 36 is rendered operative to effect a clutch disengaging operation of the actuator, and upon depressing the accelerator to open the throttle, the valve unit is rendered operative, in conjunction with a bleed valve 38 and an inertia controlled valve 40, Figure 12, to effect a clutch engaging operation of the motor in such fashion as to simulate a conventional manual engagement of the clutch. Briefly, the clutch actuator comprises cylinder and piston elements 42 and 44 respectively, the latter operatively connected to the clutch by a crank 46, a conventional clutch pedal 48 also being provided to operate the clutch.

It is furthermore to be noted that the valve 36 interconnects the conduits 28 and 30, and accordingly controls the fluid circuit leading to both the clutch and the transmission operating actuators, the latter being in parallel in the circuit, all of which is more completely brought out in the aforementioned application No. 580,434. With this construction the actuator 16 may not be energized to operate the transmission until after the accelerator is released and the clutch is disengaged, the conduits and other fluid transmitting connections and construction of the parts being such that the clutch is always disengaged before the actuator 16 is operative to mesh the gears. This result may also be accomplished by incorporating a suitable restricting valve in the connections: and, as another alternative, this result may be accomplished by means of a cutout switch 45, disclosed in Figures 1 and 18, said switch being operable to make the valve controlling circuits when the clutch is partly disengaged, and thus effect an operation of the transmission at that time. It follows that said switch is also operable to break said circuits only after the relatively moving clutch plates have come into contact with each other and before the engagement of the clutch is completed.

Figure 10:
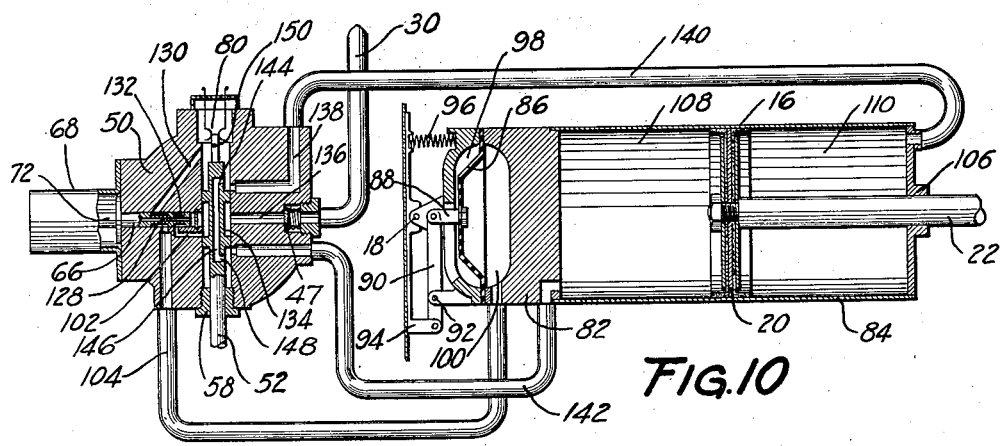
Figure 10 is a schematic lay-out of the actuator and its control valve mechanism disclosing certain structural elements thereof in section and the fluid transmitting circuits interconnecting the two.

A check valve 47, Figure 10, may, if desired, be incorporated in the conduit 30 to facilitate the aforementioned function of switch 45. Describing the operation of the check valve, it is automatically seated when the master valve 36 is operated with opening of the throttle, venting conduit 30 to the atmosphere. Such a construction, that is, the switch 45 and/or the check valve 47, insures a power loading of the transmission during a part of the time that the relatively moving clutch plates are in engagement with each other; for during this period of time the actuator 16 remains energized, all as will be described in greater detail hereinafter. Likewise, it will be noted that with this construction the desired operation of the transmission may be preselected but not actually effected until after the clutch is disengaged by the power means.

However, as above indicated, the invention is particularly directed to the power means for operating the shift lever. The valve unit 24, Figure 1, for controlling the actuator 16 comprises a casing 50 provided with a laterally extending bore to receive a reciprocable valve member 52. The valve member is normally positioned, as indicated in Figure 5, by return springs 54 and 56, interposed between the ends of the valve and closure plugs 58 and 60. The valve 52 may be, in part, manually operable by a foot treadle 62 interconnected with the valve by linkage including a three-arm lever 64. The valve casing 50 is also provided with a vertically extending bore to receive a reciprocable spool-shaped three-way valve member 66, which is preferably electrically operated by a solenoid 68 comprising a winding 70 and an armature 72, the latter constituting an end extension of the valve member 66. The solenoid is controlled by a plurality of switches including a hand selector switch 74 mounted on the steering post 76, a switch 78 operated by the speedometer or other engine or propeller shaft operated speed-responsive mechanism, and a switch 80 operated by the aforementioned valve member 52, the operation of said switches being described in greater detail hereinafter.

Figure 3:
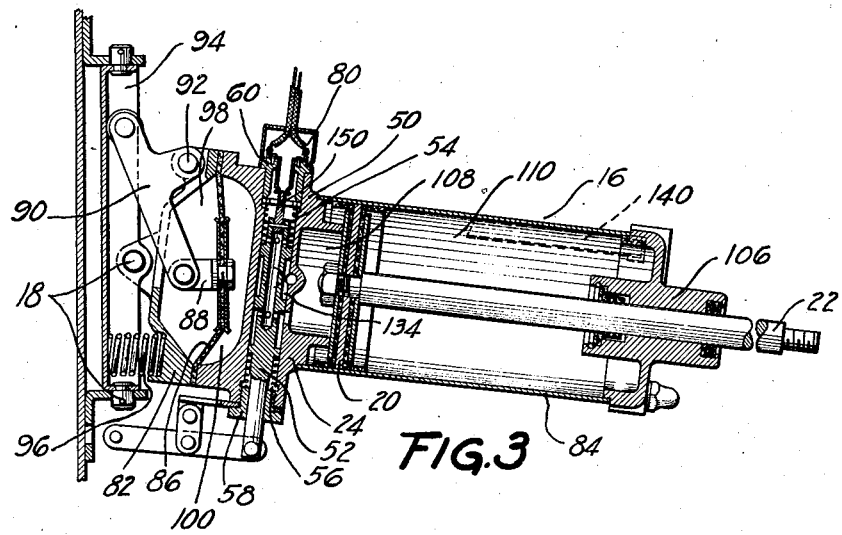
Figure 3 is a sectional view taken on the line 3—3 of Figure 1 disclosing the structure of the power actuator unit for operating the shift lever, the actuator being shown in operation to place the shift lever in the low and reverse channel of the transmission.
Figure 4:
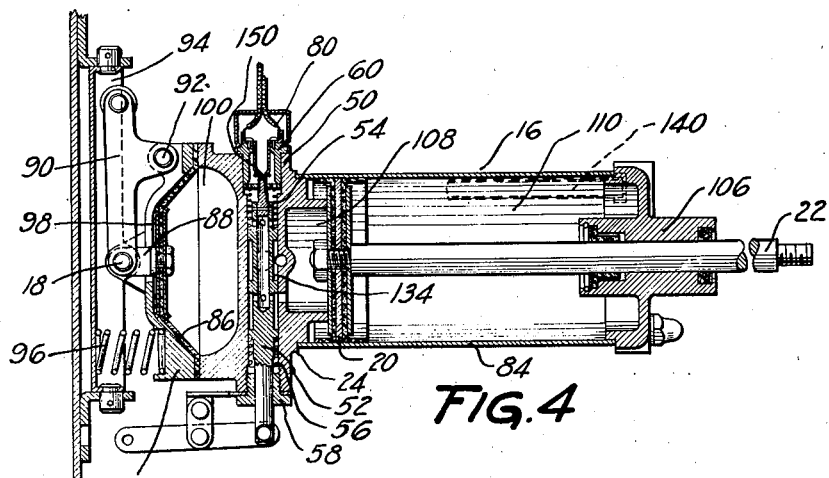
Figure 4 is a view, similar to Figure 3, disclosing the actuator in its operative position to place the shift lever in the second and high transmission channel.

Referring to the details of the actuator unit, the same includes three casing parts 82, 84 and the aforementioned valve casing part 50, the parts 50 and 82 constituting the casing member of a pressure differential operated mechanism for bodily moving the actuator unit to move the shift lever from one channel to the other of the transmission through the gate thereof. The pressure differential mechanism, which may be termed a wabble mechanism, comprises a flexible diaphragm 86, operatively connected by a link 88 to a three-arm lever member 90, the latter pivotally connected to the casing member 82 at 92 and at one of its ends having a rolling contact with a bracket member 94 secured to the dash of the vehicle. A return spring 96 is interposed between the bracket member and the casing member 82, the latter being pivotally mounted to the bracket member by the aforementioned universal joint 18 to support the actuator unit. The fluid pressure operated wabble mechanism therefore in effect constitutes a pressure differential operated motor unit comprising compartments 98 and 100, compartment 98 being vented to the atmosphere through an opening in the casing member 82 and the compartment 100 being adapted to be placed in communication with the manifold 26 via ducts 102 and 104, Figure 10, in the valve casing and valves 52 and 66, in a manner to be described in greater detail hereinafter. With this construction, when the compartment 100 is evacuated with operation of the solenoid operated valve 66, the diaphragm is drawn to the right to operate the lever 90 and force the actuator unit, against the action of spring 96, to the position disclosed in Figure 3, thereby placing the shift lever 14 in the low, reverse channel of the transmission.

The remaining structure of the actuator unit comprises the cylinder casing member 84 and an end closure member 106, which, together with the piston 20 and valve casing member 50, constitute a double-ended double-acting motor unit for moving the shift lever longitudinally in either of the channels of the transmission. The motor unit provides two chambers 108 and 110, each of which may be connected with either the atmosphere or source of vacuum in a manner to be described in detail hereinafter.

Figure 11:
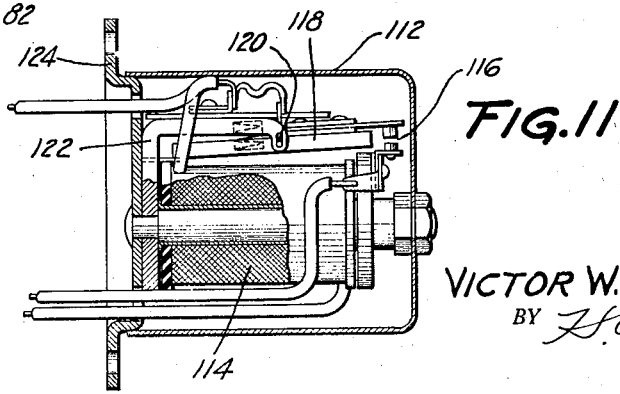
Figure 11 is a view, partly in section, disclosing the details of the relay mechanism, in part controlling the operation of the actuator to move the shift lever through the gate of the transmission.

Describing the operation of the aforementioned mechanism, with the accelerator released and the engine idling the clutch is disengaged and the manifold as a source of vacuum is placed in communication with the valve member 52 via the conduits 28 and 30 and valve unit 36. With the car at a standstill or substantially so the speedometer of the car functions to close the switch 78, thus energizing a relay 112, Figure 11, the latter closing the battery circuit to energize the solenoid 68. The speedometer controlled switch and other features of the mechanism of the instant invention are disclosed and claimed in copending application No. 686,720, filed August 25, 1933. The relay 112 constitutes a feature of this invention and comprises an insulated winding 114 adapted, when energized, to effect a closing of a contact at 116, a walking-beam armature 118 being pivoted at 120 to an L-shaped bracket member 122 secured to a mounting 124. The armature is thus positioned parallel to the winding, providing a compact relay mechanism. The solenoid being energized, the armature 72 is thus drawn to the right, Figure 5, against the action of a return spring 126 to cut off communication between a recess 128 in the valve 66 and duct 104 and a duct 130 in the valve casing, Figure 10, leading respectively to the chamber 100 and atmosphere. A recess 132 in the valve 66 is connected with the vacuum duct 102 in the casing 50 and with duct 104 therein leading to the chamber 100 to thus interconnect the chamber with the vacuum source. The actuator unit is thus energized to bodily move the same to the position of Figure 3, the connected shift lever being moved through the gate of the transmission and into the low, reverse channel thereof preparatory to effecting either a low or reverse gear shift of the transmission.

Should the operator now desire to place the transmission in low gear, preparatory to starting the car, he may depress the heel portion of the treadle 62, moving the valve 52 upwardly to the position of Figure 7. In this position of the valve a recess 134 therein interconnects a duct 136 in the valve casing 50, interconnected with the conduit 30 leading to the manifold, with a casing duct 138 and a tube 140 leading to the compartment 110 of the actuator unit, the compartment 108 of the actuator being connected to the atmosphere via a casing duct 142, Figure 10, and ports 144, duct 146 and ports 148 in the valve 52. The actuator is thus energized to move the piston 20 and the connected shift lever to effect the shift of the transmission into low gear. The accelerator is now depressed to effect a clutch engaging operation of the clutch motor 32 and accelerate the vehicle to the desired speed.

The operator now probably desires to shift into second gear, whereupon he releases the accelerator to throttle the engine and disengage the clutch. The toe portion of the treadle 62 is now depressed to move the valve 52 downwardly to the position disclosed in Figure 8. In this position of the valve the recess 134 serves to interconnect the manifold with the forward compartment 108 of the actuator via the aforementioned duct 136 and duct 142, and the rear chamber 110 of the actuator is vented via the aforementioned duct 138 and tube 140. The actuator is thus again energized to move the shift lever to effect the second gear operation of the transmission. In effecting this operation the contact made by the speedometer operated switch 78 is broken when the car is placed in motion at or above a predetermined critical speed, thus deenergizing the solenoid 68 and permitting spring 96 to move the shift lever through the gate of the transmission, the parts being so constructed that this action takes place prior to the aforementioned energization of the actuator to move the lever into its second gear position. When the solenoid is deenergized, the valve 66 is, of course, moved by the solenoid spring 126 to its position shown in Figure 8 to vent the compartment 100 to the atmosphere, thus permitting the aforementioned action of the spring 96.

The operator may then shift into high gear by again depressing the heel portion of the treadle to move the valve 52 to the position disclosed in Figure 9, the operation of the mechanism being identical with that effecting the low gear shift, Figure 7, with the exception that the solenoid is, of course, deenergized, inasmuch as the car is in motion, the speedometer operated switch 78 being open.

Should the operator desire to shift directly into second gear from a standing start, the toe portion of the treadle 62 is depressed, moving the valve 52 to the position disclosed in Figure 8. This movement of the valve serves to open the aforementioned switch 80, disclosed in detail in Figures 5 to 9 and diagrammatically in Figure 18, one of the contacts 150 of the switch being secured to one end of the valve 52. A cut-out of the relay operated circuit, Figure 18, is, of course, necessary at this time, inasmuch as the car is static and the switch 78 is closed. This makes necessary a breaking of the battery circuit by the aforementioned switch 80, for otherwise the transmission would be placed in reverse gear.

Figure 13:
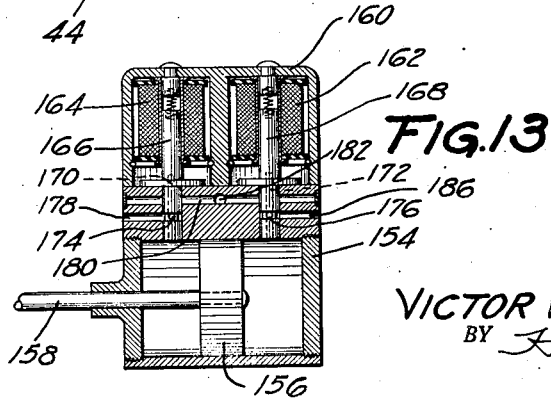
Figure 13 is a sectional view disclosing the details of the electrically controlled power unit for operating a part of the valve mechanism.

According to an important feature of the invention the aforementioned manually operated linkage for operating the valve unit 52 is interlocked with an electropneumatic power means for operating said linkage, the latter being controlled by the aforementioned selector switch 74. This switch is also designed to control the solenoid 68; therefore, if desired, the speedometer controlled relay circuit may be broken by a switch 152. To this end there is provided a double-acting pressure differential operated motor, disclosed in detail in Figure 13, said motor comprising a casing 154 and a reciprocable piston element 156 therein operably connected, by a link 158, to the lower arm of the three-arm lever member 64, Figure 2. The motor unit of Figure 13 further comprises a valve unit 160 mounted upon the top of the casing of the motor, said valve unit comprising two solenoids 162 and 164, each operable to actuate three-way valve members, the two valve members together controlling the operation of the motor. The valve members comprise piston members 166 and 168, one end of the same constituting the armatures of the operating solenoids, each of said pistons being provided with longitudinal bores 170 and 172 and cross bores 174 and 176, as disclosed in the figure.

In operation, when the solenoid 164 is energized, the piston 166 is moved upwardly to cut off communication between cross bore 174 and an atmospheric duct 178 and register said bore with a duct 180 leading to the manifold via a duct 182 and a conduit 184, the latter being tapped into the conduit 30, as disclosed in Figure 1. At the same time that piston 166 connects the left end of the casing 154 with the source of vacuum the right end or chamber of the casing is connected to atmosphere via bore 172, bore 176 and a duct 186. The piston 156 is thus moved to the left in the figure to operate the lever 64 and the connected valve unit 52. Should the solenoid 162 be energized, the reverse operation of the piston 156 is effected.

The hand operated selector switch 74 for controlling the solenoids 162 and 164 is disclosed in detail in Figures 14 to 17, inclusive, and comprises a casing 188 housing a reciprocable manually operated plunger member 190, operable by a handle 192, the member being returned to one of its off positions by a spring 194. A lead wire, not shown, connects the plunger to the battery. The switch mechanism further comprises a U-shaped yieldable contact member 196 fixed to the switch casing by a pin 198, arms 200 and 202 of the member being one or the other moved into contact with solenoid lead members 204 and 206 by means of a cam 208 fixedly secured to the plunger member 190. The latter member is also provided with a pin 210 adapted to contact stop members 212 to limit the angular movement of the cam. A spring returned contact member 214, also connected to the battery, is housed within insulating material within the switch and is adapted to be moved by one end of the plunger 190 into contact with a contact member 216 leading to the solenoid 68.

In operation, should the driver desire to control the transmission operating power means exclusively by the switch 74, the car being static and the switch 152 open, he first pushes laterally on the plunger to close the switch 214, 216, thus successively energizing the solenoid 68 and the actuator unit to move the shift lever into the low, reverse channel of the transmission. If a shift into low gear is desired, the driver now rotates the handle 192 counterclockwise to thus close the switch 208, 200, successively energizing the solenoid 164 and the pneumatic motor 156 to operate the valve 52, the latter effecting the low gear operation of the actuator unit.

In order to effect a shift into second gear the operator releases the plunger 190 and rotates the handle 192 clockwise, thus operating the switch 202, 208 to energize solenoid 162, effecting a second gear operation of the actuator unit. The operator may then again rotate the handle 192 in a counterclockwise direction to operate the selector switch to effect the high gear operation of the actuator unit. The shift into reverse may, of course, be effected by successively operating the switches 214, 216 and 202, 208. It will be noted that the operation of the switch 74 in a measure simulates a conventional operation of the shift lever, the handle 192 providing in effect a miniature shift lever.

There is thus provided an electropneumatic means interlocked with a manually controlled pedal providing a mechanism wherein the actuator valve unit may be operated either electrically or manually at the option of the driver.

A feature of the aforementioned interlock concerns the means for effecting the shift of the transmission into reverse. It will be obvious from an inspection of Figure 18 that with the foot operated treadle mechanism and the cooperating speedometer controlled switch 78 there is no means provided for effecting a reverse gear operation of the actuator unit. However, in cooperation with the switch 74 with the vehicle static, should the driver desire to place the transmission in reverse, he will close the switch 214, 216, thus energizing the solenoid 68 to maintain the shift lever in the low, reverse channel, despite the cutting out of the relay circuit by the switch 80 when the treadle 62 is toe operated.

The operation of the hand switch thus shunts the circuit, including the switch 80 and the relay, to insure the reverse gear operation of the actuator unit, the hand switch constituting a common means for controlling the valve unit either exclusively electrically or electrically and manually.

While one illustrative embodiment of the invention has been described, it is not my intention to limit the scope of the invention to that particular embodiment, or otherwise than by the terms of the appended claims.

I claim:

1. In an automotive vehicle provided with a variable-gear transmission, a clutch having driving and driven members and power means for operating the transmission, and means operable by the clutch for rendering the transmission operating power means inoperative only after the driving and driven elements of the clutch have been engaged to a predetermined degree.

2. In an automotive vehicle provided with a transmission, a clutch, power means for operating the clutch, and other power means for operating the transmission, said latter means including valve means rendered operable with the initiation of the clutch engaging operation of the clutch operating power means for insuring a loading of the transmission by the transmission operating power means until the clutch is engaged to a predetermined degree.

VICTOR W. KLIESRATH.